United States Patent
Li et al.

(10) Patent No.: US 7,532,675 B2
(45) Date of Patent: May 12, 2009

(54) TECHNIQUES TO TIME VARY PILOT LOCATIONS IN WIRELESS NETWORKS

(75) Inventors: Qinghua Li, Sunnyvale, CA (US); Xintian Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 592 days.

(21) Appl. No.: 11/317,311

(22) Filed: Dec. 23, 2005

(65) Prior Publication Data

US 2007/0147520 A1   Jun. 28, 2007

(51) Int. Cl.
H04K 1/10 (2006.01)
H04L 27/28 (2006.01)

(52) U.S. Cl. .................. 375/260; 375/284; 375/285; 375/316; 375/346

(58) Field of Classification Search ............. 375/260, 375/284, 285, 316, 346
See application file for complete search history.

(56) References Cited

U.S. PATENT DOCUMENTS

| | | | |
|---|---|---|---|
| 7,002,518 B2 | 2/2006 | Lin et al. | |
| 7,418,039 B2* | 8/2008 | Simmonds | 375/260 |
| 2003/0108013 A1* | 6/2003 | Hwang et al. | 370/335 |
| 2003/0174788 A1 | 9/2003 | Li et al. | |
| 2004/0266375 A1 | 12/2004 | Li et al. | |
| 2005/0069046 A1 | 3/2005 | Tsui et al. | |
| 2005/0088995 A1 | 4/2005 | Li et al. | |
| 2005/0111427 A1 | 5/2005 | Li et al. | |
| 2005/0129101 A1 | 6/2005 | Stephens et al. | |
| 2005/0130612 A1 | 6/2005 | Lin et al. | |
| 2005/0136910 A1 | 6/2005 | Li et al. | |
| 2005/0138199 A1 | 6/2005 | Li et al. | |
| 2005/0141420 A1 | 6/2005 | Li et al. | |
| 2005/0141459 A1 | 6/2005 | Li et al. | |
| 2005/0141495 A1 | 6/2005 | Lin et al. | |
| 2005/0141540 A1 | 6/2005 | Li et al. | |
| 2005/0143014 A1 | 6/2005 | Li et al. | |
| 2005/0144307 A1 | 6/2005 | Li et al. | |
| 2005/0146470 A1 | 7/2005 | Li et al. | |
| 2005/0146475 A1 | 7/2005 | Bettner et al. | |
| 2005/0147023 A1 | 7/2005 | Stephens et al. | |
| 2005/0147115 A1 | 7/2005 | Li et al. | |
| 2005/0157695 A1 | 7/2005 | Stephens et al. | |
| 2005/0226277 A1 | 10/2005 | Li et al. | |
| 2005/0243773 A1 | 11/2005 | Lin et al. | |
| 2005/0245286 A1 | 11/2005 | Lin et al. | |

(Continued)

OTHER PUBLICATIONS

Li et al—U.S. Appl. No. 10/742,011, filed Dec. 17, 2003—Transmit power control in a wireless system.

(Continued)

*Primary Examiner*—Ted Wang
(74) *Attorney, Agent, or Firm*—James S. Finn

(57) ABSTRACT

An embodiment of the present invention provides an apparatus, comprising a receiver capable of selecting optimal pilot locations and providing feedback of the pilot locations to a transmitter in communication with the receiver. The optimal pilot locations may be selected by locations that avoid strong interference or platform noise at the receiver, by locations that avoid deep fading, by locations that maximize the spacing between pilot tones at the two ends of a wireless frequency band or by locations that equalize the interspacing between any two adjacent pilots.

30 Claims, 6 Drawing Sheets

U.S. PATENT DOCUMENTS

| | | | |
|---|---|---|---|
| 2006/0018250 A1* | 1/2006 | Gu et al. | 370/208 |
| 2006/0045220 A1 | 3/2006 | Biswas et al. | |
| 2006/0056335 A1 | 3/2006 | Lin et al. | |
| 2006/0056531 A1 | 3/2006 | Li et al. | |
| 2006/0056532 A1 | 3/2006 | Li et al. | |
| 2006/0066369 A1 | 3/2006 | Lin et al. | |
| 2006/0067263 A1 | 3/2006 | Li et al. | |
| 2006/0068718 A1 | 3/2006 | Li et al. | |
| 2006/0068738 A1 | 3/2006 | Li et al. | |

OTHER PUBLICATIONS

Bettner et al—U.S. Appl. No. 10/976,981, filed Oct. 27, 2004—Dual band slot antenna.

Li et al—U.S. Appl. No. 10/999,620, filed Nov. 29, 2004—Techniques to manage latency for multiple receivers.

Li et al—U.S. Appl. No. 10/984,587, filed Nov. 8, 2004—Apparatus and method capable of beam forming adjustments.

Li et al—U.S. Appl. No. 10/999,621, filed Nov. 29, 2004—System and method capable of closed loop MIMO calibration.

Li et al—U.S. Appl. No. 11/006,849, filed Dec. 7, 2004—System and method capable of implicit feedback for the devices with an unequal number of transmitter and receiver.

Li et al—U.S. Appl. No. 10/937,097, filed Sep. 8, 2004—Recursive reduction of channel state feedback.

Lin et al—U.S. Appl. No. 11/040,700, filed Jan. 21, 2005—MIMO channel feedback protocols.

Lin et al—U.S. Appl. No. 11/076,195, filed Mar. 9, 2005—Method and apparaus to provide low cost transmit beamforming for network devices.

Li et al—U.S. Appl. No. 11/024,587, filed Dec. 29, 2004—Training symbol format for adaptively power loaded MIMO.

Lin et al—U.S. Appl. No. 11/017,517, filed Dec. 20, 2004—Interference rejection in wireless receivers.

Li et al—U.S. Appl. No. 11/027,300, filed Dec. 30, 2004—Downlink transmit beamforming.

Ma et al—U.S. Appl. No. 11/013,594, filed Dec. 14, 2004—Slot antenna having a MEMS varactor for resonance frequency tuning.

Li et al—U.S. Appl. No. 11/141,297, filed May 31, 2005—Open loop MIMO receiver and method using hard decision feedback.

Li et al—U.S. Appl. No. 11/040,955, filed Jan. 21, 2005—Techniques To Manage Channel Prediction.

Lin et al—U.S. Appl. No. 11/173,879, filed Jun. 30, 2005—Signal Spectrum Steering Method, Apparatus, And System.

Li et al—U.S. Appl. No. 11/150,779, filed Jun. 9, 2005—Methods And Apparatus For Beamforming Training Symbols In Wireless Multiple-input-output Systems.

Lin et al—U.S. Appl. No. 11/034,204, filed Jan. 12, 2005—Bit Distributor For Multicarrier Communication Systems Employing Adaptive Bit Loading For Multiple . . . .

Lin et al—U.S. Appl. No. 11/036,906, filed Jan. 13, 2005—Codebook Generation System And Associated Methods.

Lin et al—U.S. Appl. No. 11/059,963, filed Feb. 16, 2005—Codebook Generation System And Associated Methods.

Guo et al—U.S. Appl. No. 11/095,785, filed Mar. 31, 2005—Platform Noise Mitigation In Ofdm Receivers.

Guo et al—U.S. Appl. No. 11/132,587, filed May 19, 2005—Platform Noise Mitigation In Ofdm Receivers.

Li et al—U.S. Appl. No. 11/075,030, filed Mar. 8, 2005—Broadband Multicarrier Transmitter With Subchannel Frequency Diversity For Transmitting A Plurality . . . .

Betner et al—U.S. Appl. No. 11/169,365, filed Jun. 28, 2005—An Apparatus, System And Method Capable Of Clock Noise Mitigation Using A Frequency Adaptive Process.

Sandhu et al—U.S. Appl. No. 11/218,676, filed Sep. 2, 2005—Apparatus, System And Method Cappable Of Cooperating In A Distributed Communication Wireless Network.

Lin et al—U.S. Appl. No. 11/239,984, filed Sep. 30, 2005—Techniques For Heterogeneous Radio Cooperation.

Li et al—U.S. Appl. No. 11/322,525, filed Dec. 30, 2005—Techniques For Scheduling And Adaptation To Combat Fast Fading.

Li et al—U.S. Appl. No. 11/334,329, filed Jan. 18, 2006—Singular Value Decomposition Beamforming For A Multiple-input-multiple-output Communication System.

Guo et al—U.S. Appl. No. 11/322,829, filed Dec. 30, 2005—Improving Packet Detection In The Presence Of Platform Noise In A Wireless Network.

Lin et al—U.S. Appl. No. 11/391,054, filed Mar. 28, 2006—Wireless Network Feedback Techniques To Improve Power Control And Co-channel Interference.

Li et al—U.S. Appl. No. 11/395,363, filed Mar. 31, 2006— Efficient Training Schemes For Mimo Based Wireless Network.

Lin et al—U.S. Appl. No. 11/294,823, filed Dec. 5, 2005—Multiple Input, Multiple Output Wireless Communication System, Associated Methods And Data Structures.

Lin et al—U.S. Appl. No. 11/313,532, filed Dec. 20, 2005—Multiple Input, Multiple Output Wireless Communication System, Associated Methods And Data Structures.

Lin et al—U.S. Appl. No. 11/294,849, filed Dec. 05, 2005—Multiple Input, Multiple Output Wireless Communication System, Associated Methods And Data Structures.

Lin et al—U.S. Appl. No. 11/313,489, filed Dec. 20, 2005—Multiple Input, Multiple Output Wireless Communication System, Associated Methods And Data Structures.

Li et al—U.S. Appl. No. 10/321,024, filed Dec. 16, 2002—Adaptive Receiver Architecture.

Liu et al—U.S. Appl. No. 10/954,019, filed Sep. 28, 2004—Multi-antenna Multicarrier Receiver And Methods For Adaptively Adjusting A Receive Data Rate Based On Channel.

Li et al—U.S. Appl. No. 11/011,208, filed Dec. 13, 2004—Techniques To Manage Retransmissions In a Wireless Network.

Li et al—U.S. Appl. No. 10/990,260, filed Nov. 15, 2004—Technique To Increase A Code Rate In A Mimo System Using Virtual Channels.

Maltsev et al—U.S. Appl. No. 11/004,720, filed Dec. 3, 2004—Multiple Antenna Multicarrier Transmitter And Method For Adaptive Beamforming With Transmit-power . . . .

Li et al—U.S. Appl. No. 11/062,539, filed Feb. 22, 2005—Method And Apparatus To Perform Network Medium Reservation In A Wireless Network.

Davydov et al—U.S. Appl. No. 11/234,972, filed Sep. 26, 2005—Multicarrier Transmitter For Multiple-input Multiple-output Communication Systems And Methods For . . . .

Dong et al—U.S. Appl. No. 11/323,819, filed Dec. 30, 2005—Receiver And Method For Channel Estimation For Multicarrier Communication Systems.

* cited by examiner

| Interference signal frequency(MHz), power=-81 dBm | SNR degradation (dB) at 10mbps throughput at Channel 6 | | | |
|---|---|---|---|---|
| | Intel 2915ABG 11/07/04 | Intel 2915ABG 5/18/04 | Broadcom BCM94309MP | Atheros CM90200A |
| 2438 (f0+1) | 11 | 10 | 12 | 10 |
| 2439.1875 (f0+7*0.3125) | 20 | 19 | 25 | 17 |

FIG. 1

TECHNIQUES TO TIME VARY PILOT LOCATIONS IN WIRELESS NETWORKS

BACKGROUND

Wireless communications, including wireless networks, have become pervasive throughout society. Improvements in wireless communications are vital to increase their reliability and speed. Present wireless communication standards, such as but not limited to, current 802.11a/g and TGnSync proposals, may use pilot locations that are constant over time. Namely, a fixed set of subcarriers may be assigned for pilots for the whole system all the time. This may cause a problem in the presence of platform noise and co-channel narrow band interference. Because the receiver can't gain a synchronization signal from the pilots for a certain period, the receiver's PLL loses synchronization with the transmitter, and thus the packets may get lost.

Extensive measurements demonstrate that mobile platform noise may be a significant factor of WLAN performance degradation. Further, the performance of 802.11a loses more than 20 dB if one of the pilot tones is corrupted by platform noise or co-channel interference of −83 dBm. In contrast, the corruption of data tones with the same interference power only causes a 10 dB lose. Simulation results for 802.11n demonstrate that loss of pilot tones due to fading significantly degrades performance by 0.5-6 dB.

Thus, a strong need exists for techniques to time vary pilot locations in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 provides a table with SNR loss under narrow band interference of an embodiment of the present invention;

Figure 2:
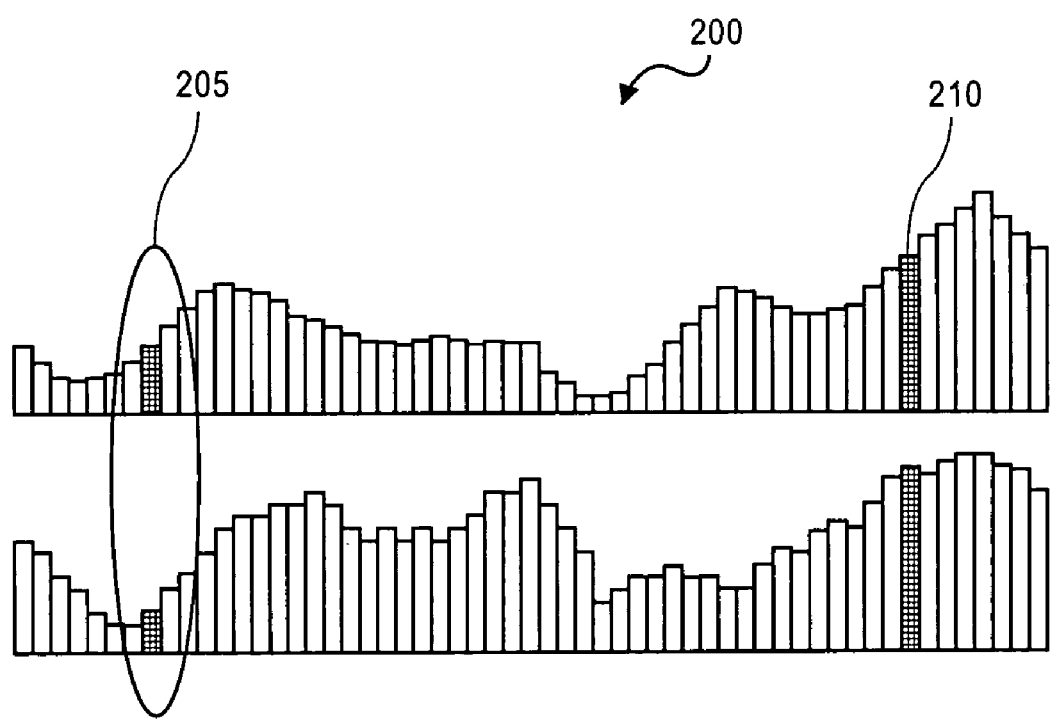
FIG. 2 illustrates the loss of two pilots in two spatial streams due to fading.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN) and Mesh networks.

Some embodiments of the present invention provide pilot techniques that are robust to interference and fading. In an embodiment of the present invention, the transmitter may vary pilot tone locations. The receiver may feed back the pilot tone locations to the sender according to the receiver's interference or fading profile. The pilots may be located at the tones with higher channel gains and less interference. For simplicity, the variation of pilot location may be parameterized by a step size of shift in order to maintain the relative spacing between pilot tones. In another embodiment of the present invention, the sender may change the pilot locations across OFDM symbols. Three advantages are thus provided: First, it prevents the pilot from constantly getting lost. Second, frequency diversity may be obtained. Finally, frequency resolution of channel tracking may be increased. Thus, a major benefit of the techniques provided herein is that the number of pilot tones may be reduced and the throughput may be increased.

In current wireless standards, such as but not limited to, 802.11a/g and TGnSync proposal to IEEE 802.11n, pilot locations are constant. Namely, a fixed set of subcarriers are assigned for pilots for the whole system all the time. This causes a problem in the presence of platform noise and co-channel narrow band interference. Because the receiver can't gain synchronization signal from the pilots for a certain period, the receiver's phase-locked loop (PLL) loses synchronization with the transmitter, and thus the packets may get lost. Measurements demonstrate that mobile platform noise is significant factor of WLAN performance degradation. Further, the performance of 802.11g loses 20 dB if one of the pilot tones is corrupted by platform noise or co-channel interference. In contrast, the corruption of data tones with the same interference power only causes a 10 dB lose.

Turning now to the figures, FIG. 1 at 100 shows a table illustrating the SNR loss 105 with narrow band interference 110. Interference frequency of 2439.1875 MHz 120 corresponds to one of the pilot tones in channel 6. On the other hand 2438 MHz 115 interferer only interferes with data tones.

Although not limited in this respect nor limited to 802.11g, the pilot tones in 802.11g band may occupy 13*4*0.3125=16.25 MHz in the 76 MHz spectrum of the ISM band. Therefore, there is a 16.25/76=21% chance for any narrow band interferer to corrupt pilot tones. Experiments show that there are more than a few narrowband interferers in 802.11 g band, making a corrupted pilot a highly probable reality. Simulation results for 802.11n also demonstrate that loss of pilot tones due to fading significantly degrades performance by 0.3-6 dB.

In FIG. 2 at 200, the effect of fading on pilot tones is illustrated. The four pilots may be located on two tones and two spatial channels 205 and 210. Since there is typically some correlation in the received signal of two antennas due to space limitation and platform coupling, it is likely that a pilot tone experiences destructive fading on both spatial channels. Conventional receivers estimate frequency offset using at least two pilots on two different tones per OFDM symbol. If one pilot tone is faded, the frequency offset can't be estimated using the current OFDM symbol (even though the estimation may be still possible using multiple OFDM symbols including the previous).

Figure 3:
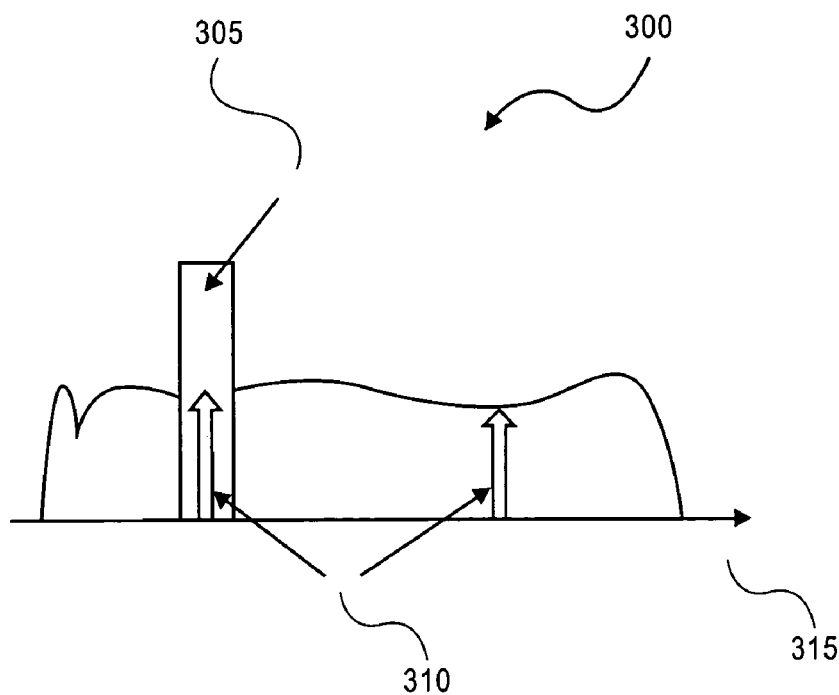
FIG. 3 illustrates the loss of one pilot due to platform noise or co-channel interference.

Turning now to FIG. 3, the effect of platform noise and co-channel interference 305 on pilot tones are illustrated generally at 300 as a function of frequency 315. Platform noise 305 consists of various harmonics of various clocks in the host computer of the receiver while co-channel interference 305 includes other narrow band signals (such as Bluetooth) located in the same wireless local area network (WLAN) band. These two impairments may corrupt the pilot tone 310 and cause synchronization problems.

Figure 4:
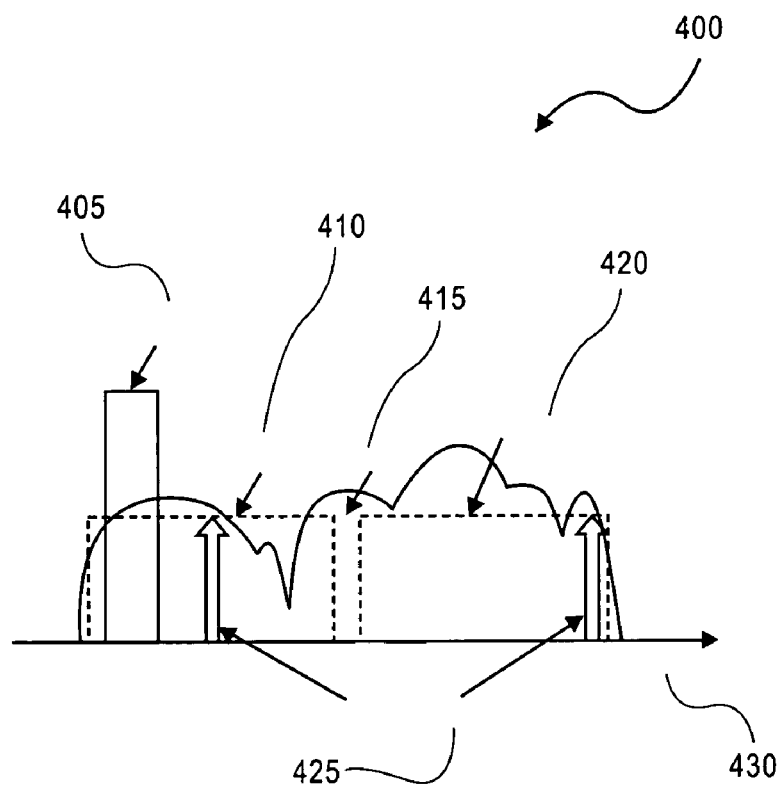
FIG. 4 is an illustration of one technique to time vary pilot locations with feedback in a wireless network of one embodiment of the present invention.

Depicted in FIG. 4 at 400, is an embodiment of the present invention which provides two robust pilot schemes, one with feedback and the other without. A first technique that provides a receiver first select optimal locations is shown graphically as a function of frequency 430, with mobile pilots selected as shown at 425 and data tones and DC tones at 410, 420 and 415 respectively. The criterion that may be used is as follows—although the present invention is not limited to these criterions.

1. Avoid strong interference or platform noise at the receiver.
2. Avoid deep fading. Criterions 1 and 2 improve the signal to noise plus interference of the received pilots.
3. Subjected to criterions 1 and 2, maximize the spacing between pilot tones at the two ends of the band. This optimizes the estimation of frequency offset because the estimation of frequency offset improves as the spacing between pilots increases.
4. Subjected to criterions 1 and 2, equalize the interspacing between any two adjacent pilots. This optimizes channel tracking because even pilot locations are desired for channel interpolation. However, if this conflicts with criterion 3 when there are more than two pilots, criterion 3 has a higher priority.

Figure 5:
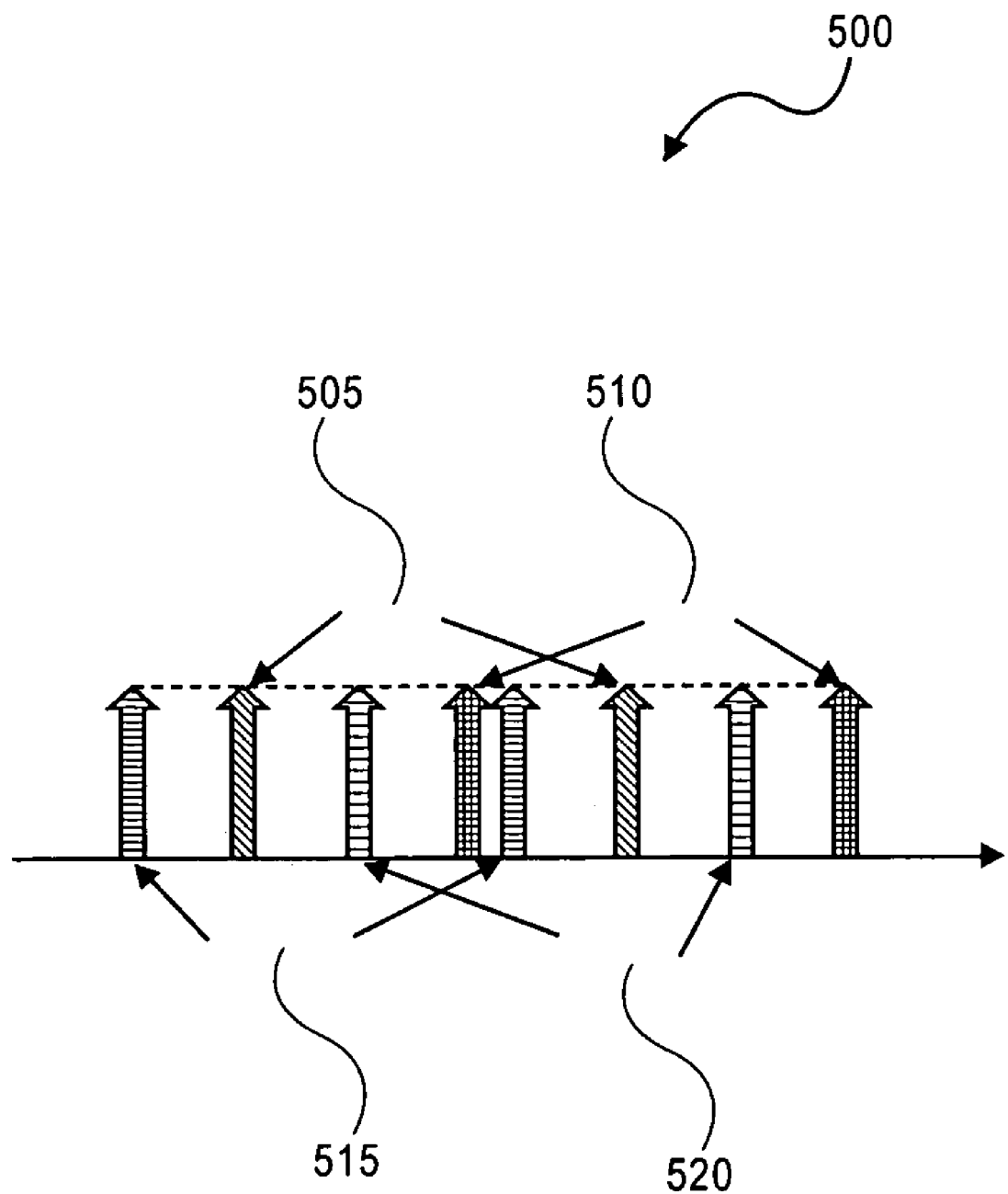
FIG. 5 is an illustration of one technique to time vary pilot locations in a wireless network without feed back and with pilot patterns of one embodiment of the present invention.

After the pilot locations are selected, the receiver may feed back the pilot locations in a piggy back way such as sending the feedback by an ACK packet. In order to reduce the amount of feedback, a set of pilot location patterns may be defined and the receiver may only feed back the index of the selected location pattern. The transmitter may include the feed back index in the transmitting frame to acknowledge received pilot pattern and indicate the current pilot pattern. An example is shown in FIG. 5, where four pilot patterns 505, 510, 515 and 520 are defined. The receiver selects one out of four choices in favor of its channel/interference status, where each pattern has two pilot locations. The feedback only needs two bits. If the feedback is not available, the transmitter may employ a default pattern. It is understood that the present invention is not limited to four choices and this is provided for illustrative purposes only.

Figure 6:
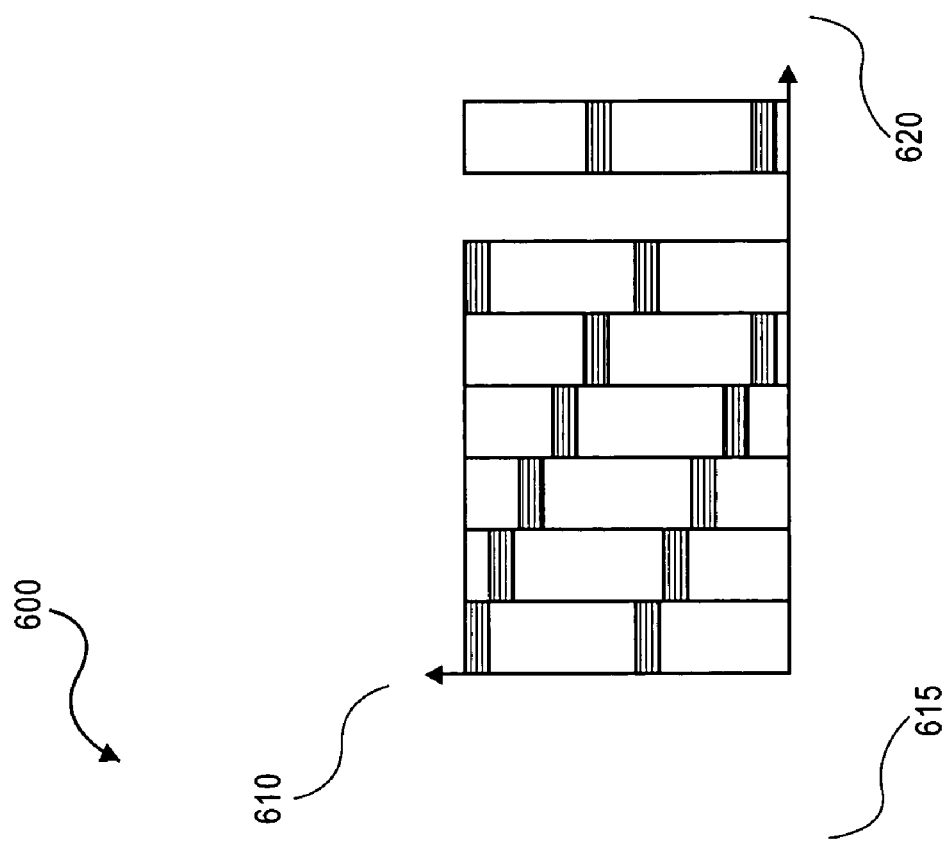
FIG. 6 depicts how a transmitter may vary the pilot location across OFDM symbols of one embodiment of the present invention.
Figure 6:
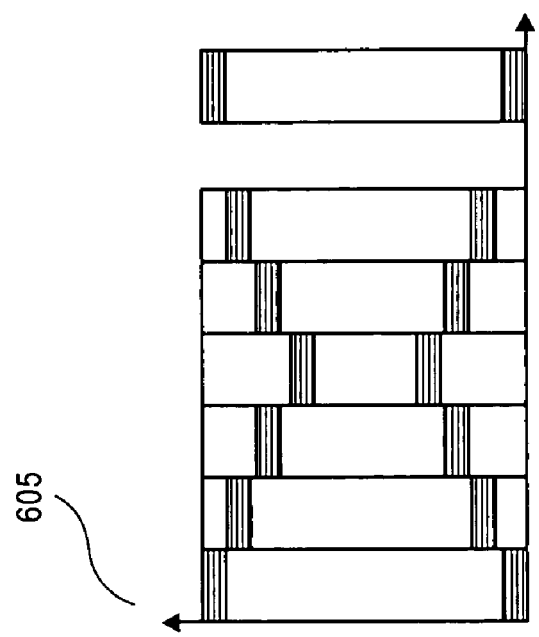

In another embodiment of the present invention, in the case that feedback is not available; the transmitter may vary the pilot location across OFDM symbols. Even though the pilots are lost in some symbols, they are recovered in the other symbols. Two examples are illustrated in FIG. 6, at 600 in frequency 605 and 610 vs. OFDM Symbol 615 and 620; although the present invention is not limited to these examples.

Figure 7:
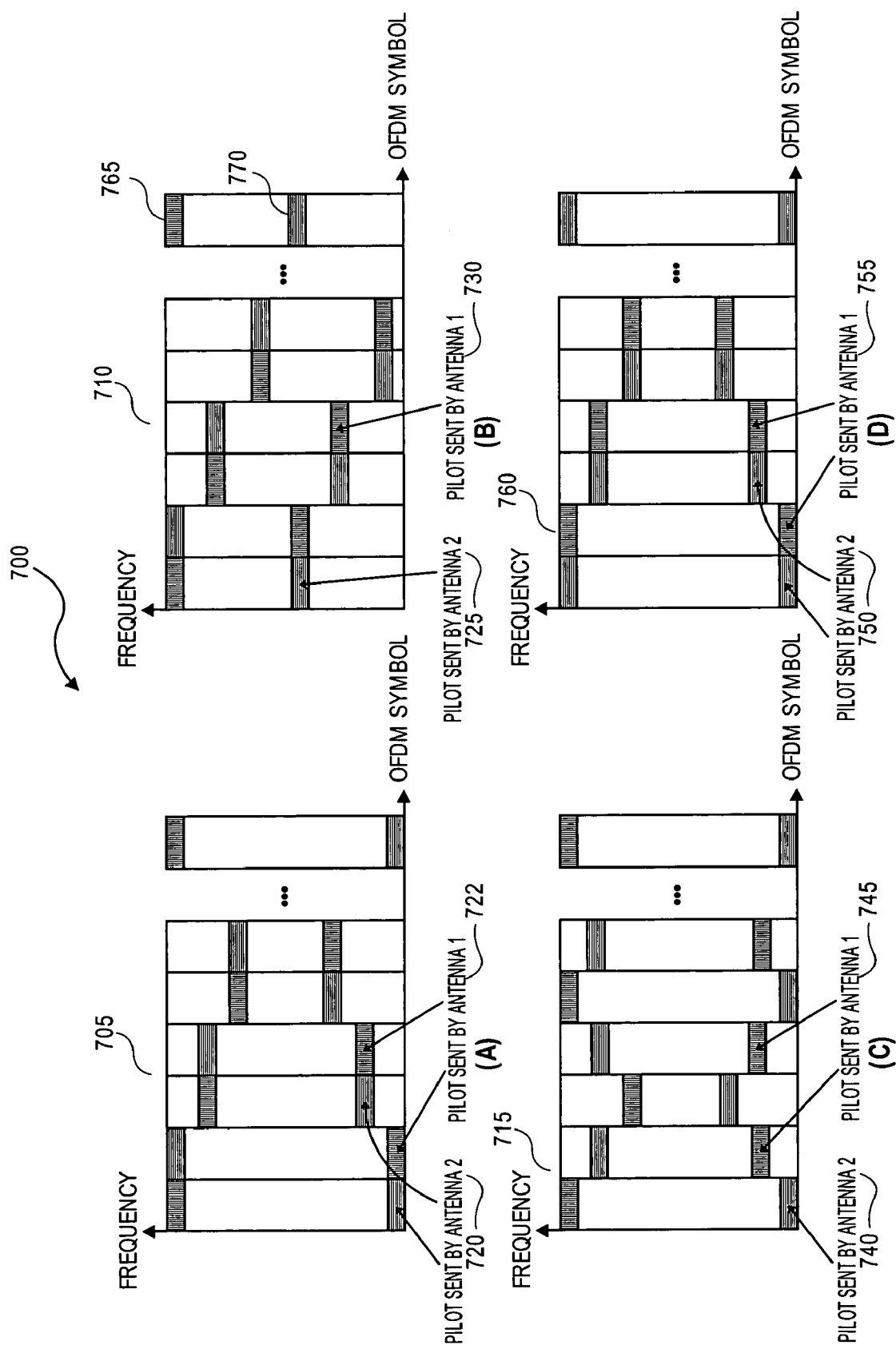
FIG. 7 illustrates spreading pilots across frequency, time and antenna.

In yet another embedment of the present invention spreading the pilot across frequency and time may be extended to frequency, time, and antenna. For systems employing multiple transmit antennas, the pilot may be spread out across antennas to avoid destructive fading at the receiver. As illustrated in FIG. 7, generally as 700, spreading pilots across frequency, time, and antenna may be utilized and have been considered in the Institute for Electronic and Electrical Engineers (IEEE 802.16e) standard. However, the purpose is for channel estimation and not phase tracking of PLL (or phase offset estimation). The requirement in the IEEE 802.16e standard is to uniformly spread out the pilot in frequency, time, and antenna but in an embodiment of the present invention no uniformity is required. In the following description as it relates to FIG. 7, pilots sent by antenna 2 are depicted in the shading shown as 770 and pilots sent by antenna 1 are depicted in the shading shown as 765.

In an embodiment of the present invention the, pilots of the same OFDM symbol may separate apart to help phase offset estimation as shown in (d) 760 (pilot sent by antenna 1 is shown as 755, and pilot sent by antenna 2 is illustrated at 750). In figure (a) 705 (pilot sent by antenna 1 is shown as 722, and pilot sent by antenna 2 is illustrated at 720), (b) 710 (pilot sent by antenna 1 is shown as 730, and pilot sent by antenna 2 is illustrated at 725) and (d) 760 (pilot sent by antenna 1 is shown as 755, and pilot sent by antenna 2 is illustrated at 750), the pilots may occupy the one subcarrier for two (or more) adjacent OFDM symbols, because space-time coding in the data subcarriers may use the same subcarrier across adjacent OFDM symbols. This is not required for phase offset estimation as shown in (c) 715 (pilot sent by antenna 1 is shown as 745, and pilot sent by antenna 2 is illustrated at 740). In addition, two pilots for the same OFDM symbol may be sent by the same or different antennas for phase offset estimation as shown in (c) 715 and (d) 760.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
a receiver capable of selecting optimal pilot locations and providing feedback of said pilot locations to a transmitter in communication with said receiver;
wherein said optimal pilot locations are selected by locations that avoid strong interference or platform noise at said receiver; and
wherein said optimal pilot locations are selected by locations that avoid deep fading.

2. The apparatus of claim 1, wherein said optimal pilot locations are selected by locations that maximize the spacing between pilot tones at the two ends of a wireless frequency band.

3. The apparatus of claim 1, wherein said optimal pilot locations are selected by locations that equalize the interspacing between any two adjacent pilots.

4. The apparatus of claim 1, wherein the providing feedback of said pilot locations to a transmitter in communication with said receive is accomplished in a piggy back method.

5. The apparatus of claim 4, wherein said piggy back method is sending the feedback by an ACK packet.

6. The apparatus of claim 4, wherein said feedback is accomplished by defining a set of pilot location patterns and wherein said receiver only feeds back the index of the selected location pattern.

7. The apparatus of claim 6, wherein if said feedback is not available, said transmitter may employ a default pattern.

8. The apparatus of claim 6, wherein if said feedback is not available, said transmitter varies said pilot location across OFDM symbols.

9. The apparatus of claim 8, wherein if said feedback is not available, said transmitter spreads said pilot across frequency, time, and antenna.

10. The apparatus of claim 9, wherein said spreading of said pilot across frequency, time, and antenna may be done non-uniformly.

11. The apparatus of claim 9, wherein two pilots for the same OFDM symbol are capable of being sent by the same or different antennas for phase offset estimation.

12. A method, comprising:
selecting optimal pilot locations by a receiver,
providing feedback of said pilot locations to a transmitter in communication with said receiver;
selecting pilot locations that avoid strong interference or platform noise at said receiver, and
selecting pilot locations that avoid deep fading.

13. The method of claim 12, further comprising selecting pilot locations that maximize the spacing between pilot tones at the two ends of a wireless frequency band.

14. The method of claim 12, further comprising selecting pilot locations that equalize the interspacing between any two adjacent pilots.

15. The method of claim 12, wherein the providing feedback of said pilot locations to a transmitter in communication with said receive is accomplished in a piggy back method.

16. The method of claim 15, further comprising sending the feedback by an ACK packet as said piggy back method.

17. The method of claim 15, wherein said feedback is accomplished by defining a set of pilot location patterns and wherein said receiver only feeds back the index of the selected location pattern.

18. The method of claim 17, further comprising employing a default pattern if said feedback is not available.

19. The method of claim 17, further comprising varying said pilot location across OFDM symbols if said feedback is not available.

20. A machine-accessible medium that provides instructions, which when accessed, cause a machine to perform operations comprising:
selecting optimal pilot locations by a receiver,
providing feedback of said pilot locations to a transmitter in communication with said receiver,
selecting pilot locations that avoid strong interference or platform noise at said receiver; and
selecting pilot locations that avoid deep fading.

21. The machine-accessible medium that provides instructions of claim 20, further comprising said instructions causing said machine to select pilot locations that maximize the spacing between pilot tones at the two ends of a wireless frequency band.

22. The machine-accessible medium that provides instructions of claim 20, further comprising said instructions causing said machine to select pilot locations that equalize interspacing between any two adjacent pilots.

23. The machine-accessible medium that provides instructions of claim 20, wherein the providing feedback of said pilot locations to a transmitter in communication with said receive is accomplished in a piggy back method.

24. The machine-accessible medium that provides instructions of claim 23, further comprising said instructions causing said machine to send the feedback by an ACK packet as said piggy back method.

25. The machine-accessible medium that provides instructions of claim 23, wherein said feedback is accomplished by defining a set of pilot location patterns and wherein said receiver only feeds back the index of the selected location pattern.

26. The machine-accessible medium that provides instructions of claim 25, further comprising said instructions causing said machine to employ a default pattern if said feedback is not available.

27. The machine-accessible medium that provides instructions of claim 25, further comprising said instructions causing said machine to vary said pilot location across OFDM symbols if said feedback is not available.

28. A system, comprising:
a transmitter capable of transmitting via a dipole antenna associated with said transmitter,
a receiver in communication with said transmitter and capable of selecting optimal pilot locations and providing feedback of said pilot locations to said transmitter;
wherein said optimal pilot locations are selected by locations that avoid strong interference or platform noise at said receiver; and
wherein said optimal pilot locations are selected by locations that avoid deep fading.

29. The system of claim 28, wherein said optimal pilot locations are selected by locations that maximize the spacing between pilot tones at the two ends of a wireless frequency band.

30. The system of claim 28, wherein said optimal pilot locations are selected by locations that equalize the interspacing between any two adjacent pilots.

* * * * *